United States Patent

Wurzer

[15] 3,662,549
[45] May 16, 1972

[54] POSITIVE DISPLACEMENT MACHINE WITH A CONTINUOUSLY VARIABLE ADJUSTMENT FOR A HYDROSTATIC GEAR

[72] Inventor: Joachim Wurzer, Theodor Storm Strasse 47, 28 Bremen, Germany

[22] Filed: June 22, 1970

[21] Appl. No.: 48,006

[52] U.S. Cl. ............................60/53 B, 91/491, 91/495, 417/274
[51] Int. Cl. .....................................................F16d 31/02
[58] Field of Search .............60/53 B; 417/274; 91/491, 495

[56] References Cited

UNITED STATES PATENTS

| | | | |
|---|---|---|---|
| 1,310,945 | 7/1919 | Martino et al. | 60/53 B |
| 1,924,017 | 8/1933 | Bedford | 60/53 B |
| 3,033,119 | 5/1962 | Pschunder | 417/274 |
| 3,482,521 | 12/1969 | Wolf | 417/274 |

*Primary Examiner*—Edgar W. Geoghegan
*Attorney*—Watson, Cole, Grindle & Watson

[57] ABSTRACT

Stepless variable hydrostatic gear comprising a positive displacement pump and motor, at least one of which has means for the adjustment of the displacement volume, causing an alteration in the gear ratio; said means being constituted by wall parts which are movable under hydraulic pressure.

5 Claims, 3 Drawing Figures

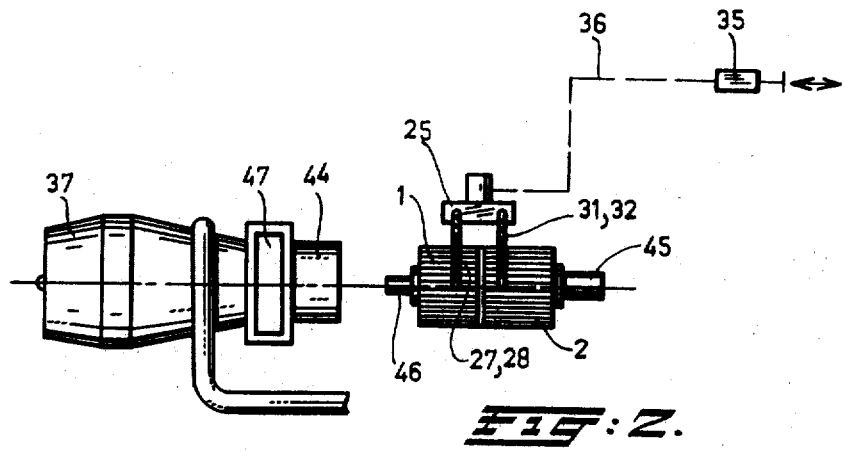
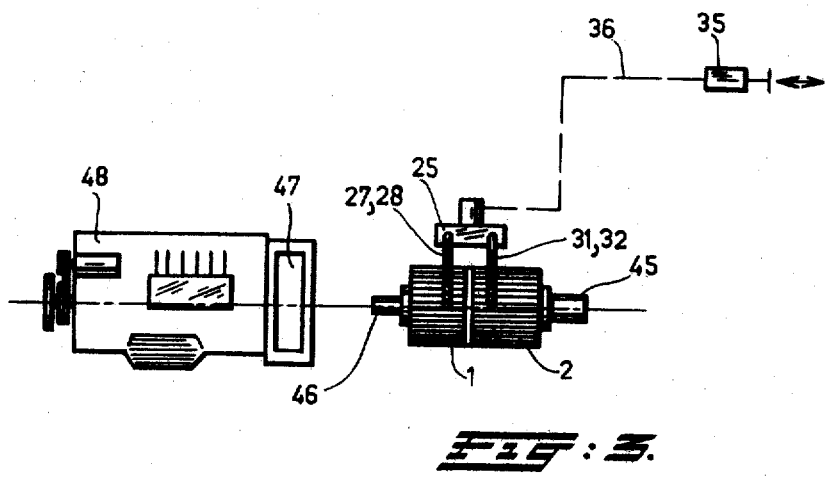

POSITIVE DISPLACEMENT MACHINE WITH A CONTINUOUSLY VARIABLE ADJUSTMENT FOR A HYDROSTATIC GEAR

BACKGROUND OF THE DISCLOSURE

The invention relates to a positive displacement machine with a stepless variable adjustment (pump and/or hydraulic motor) for a hydrostatic gear with a housing, comprising low pressure and high pressure working spaces and rotary displacement members rotors. The gear ratio of such machines can be changed by varying the displacement volume.

It is an object of the invention to provide a transmission in which a continuously variable adjustment of the displacement volume of the hydrostatic gear is possible with simple and inexpensive means. In the prior art machines, the volume of the fluid is changed by throttling, which only causes heat losses.

SUMMARY OF THE INVENTION

According to the invention the rotor is provided with chambers comprising movable walls, thus forming accumulation chambers which communicate with the working spaces of the machine, means being provided for making the pressure on the lower pressure (L.P.) side of the machine adjustable so that the volume of said chambers on traversing the L.P. space can be modified in such a manner that, due to the alteration of the aforementioned pressure, the displacement volume of the machine is varied.

In piston pumps with upright cylinders applied in a hydrostatic operation mechanism, it is known to provide a compensating piston with a chamber which is connected with the sole connecting pipe between the pump and the adjustment motor. In order to change the volume of the chamber, a biased piston which is slidable between two abutments, is provided in such chamber, the location of the one abutment being variable so that the stroke of this compensation piston is adjustable. With an identical stroke displacement of the pump piston and the compensating piston, the effective output of the pump is negligible and, with the decreasing stroke of the compensating piston, the quantity of medium displaced by the pump increases and the piston of the adjustment motor is reciprocated with greater amplitudes.

In another known piston pump having an upright cylinder, which produces an uninterrupted flow of medium, a two-part piston is provided, whereby, in spite of the non-variable stroke of the driving eccentric, the quantity of medium conveyed by the pump can be adjusted as a consequence of the controlled relative movements between the two parts of the said piston. The adjustment of the conveyed quantity of medium is effected by throttling the suction piping, whereby the pressure in the space between the two parts of the piston can be changed together with the changeable pressure past the throttle. The connecting bores which convey the medium to this intermediate space therefore have a smaller flow resistance as compared to the suction openings between the suction space and the working space of the piston.

It is made passible with the present invention that, throughout the continuously variable range of regulation for the number of revolutions of the machine, the torque of the hydraulic motor is constant at a constant hydrostatic pressure of the medium, e.g. oil, which transmits the energy. This advantage of the invention permits use of the machine as a driving gear, the ratio of which is variable in a stepless manner, for equipment which need a constant torque in spite of the variation of the driving speed of rotation. In the machine according to the invention this practical condition is satisfied in an economic way and with insignificant technical complications.

A further advantageous effect of the invention is that, with a minimal use of technical means, the continuously variable adjustment of the number of revolutions of the hydraulic motor of the machine is achieved. Expensive control apparatus for varying the circulated volumes of medium of the positive displacement machine (hydraulic motor and/or hydraulic pump) in order to thereby achieve a continuously variable adjustment of the number of revolutions of the hydraulic motor, can be omitted.

A performance-to-weight ratio may be achieved with the machine according to the invention which is more advantageous as compared to the known positive displacement combinations operating, for example, with axial pistons or radial pistons and with vanes wherein a stepless variable adjustment of the number of revolutions is possible. As compared to one of known techniques for achieving a stepless hydraulic variable drive, which includes throttling means incorporated between the pump and the motor, the present invention makes use of a changeable hydrostatic pressure of the operative medium on the L.P. side of the hydraulic pump and/or the hydraulic motor. As a result, an exact modification of the volume of displacement of the machine is achieved without losses. The energy stored by the controllable filling of the chambers of the rotor (e.g. of the hydraulic motor) on the L.P. side is again utilized on the high pressure (H.P.) side of the hydraulic motor.

According to a further aspect of the invention to movable walls of the accumulation chambers may be provided in the driving pistons of the machine and, for example, constructed as spring loaded plungers. A space saving construction is thereby obtained. Furthermore such spring loaded plungers may be axially disposed in the rotors of the machine in order to avoid unbalances on the rotor. This may be of importance especially in fast running machines with radial pistons or cells.

BRIEF DESCRIPTION OF THE DRAWINGS

FIG. 2 represents a compact driving gear according to the invention which is driven by a gas turbine with an intermediate reduction gear box; and FIG. 3 shows a compact driving gear driven by a combustion motor.

DESCRIPTION OF A PREFERRED EMBODIMENT

Figure 1:
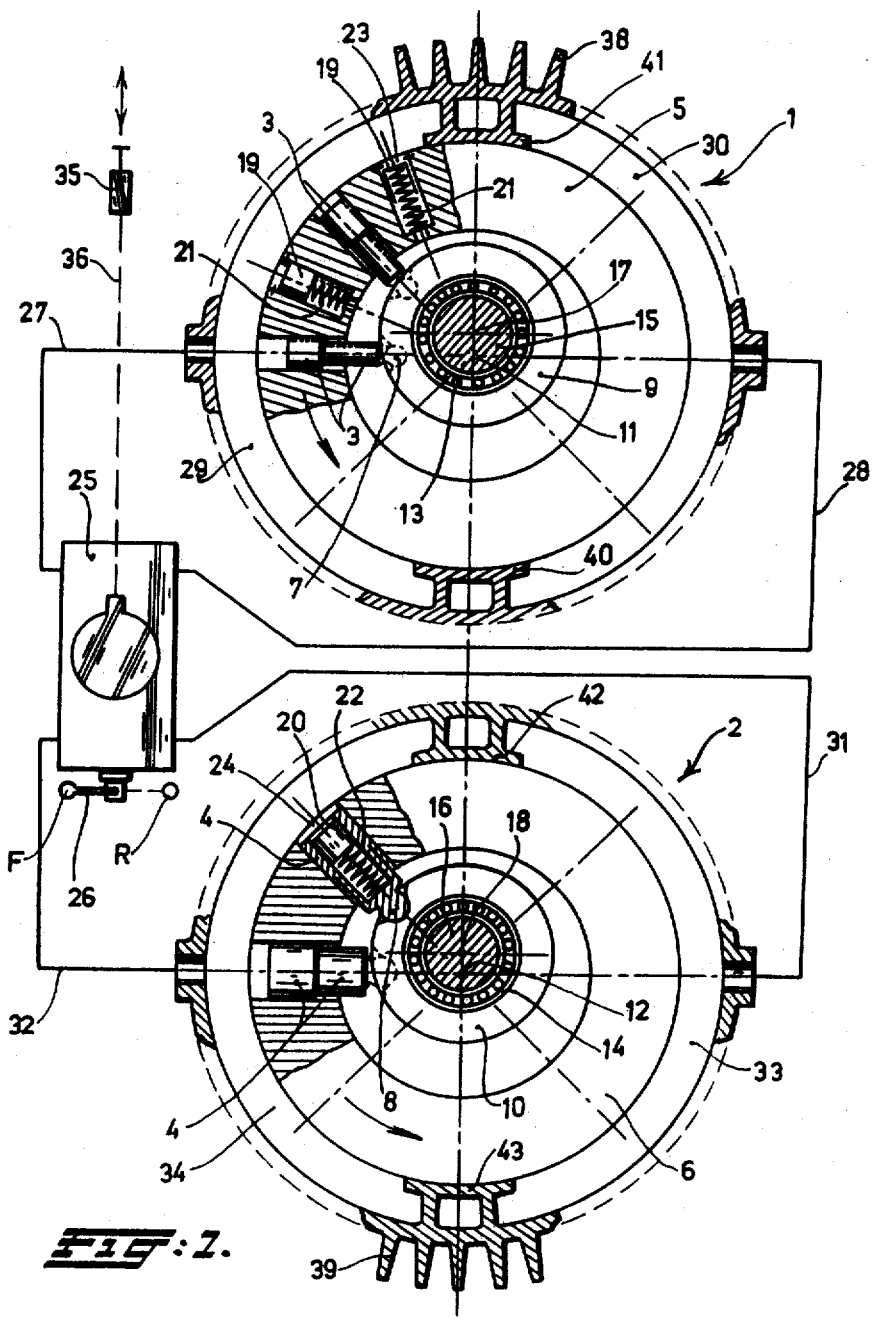
FIG. 1 is a cross section through a machine consisting of an hydraulic pump and an hydraulic motor with a constant displacement volume and a hydrostatic pressure regulator.

According to FIG. 1 a hydraulic pump 1 and a hydraulic motor 2 are provided with radial pistons 3, 4, respectively. The eight pump pistons 3 and the eight motor pistons 4 are supported in the radial rotors 5, 6 respectively and bear by means of their respective ball bearings 7, 8 in a ring 9, 10, respectively. The center lines of the pistons 3 and 4 are directed towards the axes or centers of rotation 11, 12 of the rotor 5, 6,. The rings 9, 10 respectively are supported by their respective ball bearings 13, 14 on fixed shafts 15, 16 respectively with center lines 17, 18 respectively.

The driving torque for the hydraulic pump 1 and therefore for the driven machine, e.g., the differential of a motor vehicle, connected in series with the hydraulic motor 2 depends on the working pressure, the number and consequently the operative total surface of the pistons 3, 4 respectively and on the (fixed) eccentricity, that is to say the distance of the centers between 11, to 17 and 12, 18, respectively. If the fixed eccentricity amounts e.g. 20 mm, the stroke of the pistons 3 and 4 is 40 mm and a particular constant displacement volume is obtained.

Plungers 19, 20 can be respectively supported in the rotor 5, 6 or in the pistons 3, 4 of the hydraulic pump 1 and the hydraulic motor 2, respectively. These plungers 19 and 20 bear against the springs 21, 22 respectively and constitute the so-called accumulation chambers 23, 24 for the hydraulic pump 1 and the hydraulic motor 2, respectively. The strength of the springs 21 and 22 may e.g. be determined in such a manner that the uptake capacity or the displacement volume of these chambers 23 and 24 at a hydrostatic pressure of the medium of 1 atmosphere overpressure is negligible, while at 4 atmospheres it amounts maximally to 6 and 18, respectively units of volume.

In this connection the constant displacement volume of the pistons 3 and 4 should always amount to 6 units of volume. The machine according to FIG. 1 further includes a pressure regulator 25 with operating member 26, the regulator being of conventional design as having an accumulation space with a membrane and either a spring or pneumatic pressure on the other side of the membrane to maintain the pressure of fluid in the accumulation space at the required pressure of 1 or 2 or even 4 atmospheres overpressure. The regulator 25 communicates via the pipes 27 and 28 with the L.P. space 29, the H.P. space 30, respectively of the pump 1. The regulator is further connected, via the pipes 31 and 32, with the L.P. space 33 and the H.P. space 34, respectively of the motor 2. The pressure in H.P. spaces 30 and 34 is at all times considerably higher than the aforementioned 4 atmospheres overpressure of the L.P. space.

If the hydraulic pump 1 is driven at a particular number of revolutions in the direction of rotation indicated in FIG. 2 and a pressure of e.g. 1 atmosphere overpressure is adjusted by the pressure regulator 25 in the L.P. space 29 and 33 and also in the pipes 27 and 31, then the quantity of compressed medium produced in the H.P. space 30 by the hydraulic pump is equal to 6 units (per piston 3) minus 6 units (per accumulation chamber 23) and as a consequence is negligible. The displacement volume of the motor 2 in the H.P. space 34 can, when medium is supplied from the pump 1, maximally amount to 6 plus 18 or 24 units of volume per piston 4.

As will be appreciated from the foregoing, the rotor 6 of motor 2 is at a standstill when in, the direction of rotation represented in FIG. 1, the pressure in pipes 27 and 31 is adjusted at 1 atmosphere over pressure by pressure regulator 25.

In the other extreme case of 4 atmospheres overpressure in pipes 27 and 31, chambers 19 are filled with 6 units of volume in the L.P. space 29 and the pistons 3 in the H.P. space 30 will each displace 6 units of volume. This quantity of medium maximally conveyed by pump 1 is pressed from the space 30 through pipe 28, via regulator 25 and pipe 32, into the H.P. space 34 of the motor 2. Since at a pressure of e.g. 4 atmospheres overpressure in the L.P. space 33 of the motor 2, the plungers 20 are each filled with 18 units of volume the pistons 4 of the motor 2 can each only take up 24 minus 18 or 6 units of volume in the H.P. space 34. Consequently at the maximum output of likewise 6 units of volume per piston 3 of the pump 1 the number of revolutions of the rotor 6 of the motor 2 will be equal to the driving speed of rotation of the pump 1.

If e.g. the pump 1 is driven at a rate of 2,500 revolutions per minute, the number of revolutions at the output of the motor 2 can also, via the described variation of pressure on the L.P. side, be adjusted in a stepless variable manner ranging from 0 to 2,500 revolutions per minute. The operating member 26 of the pressure regulator 25 can be controlled at a distance e.g., via the pipe 36, by a hydraulic telemotor 35. The pressure regulator 25 can further be arranged in such a manner that in spite of the adjustment at 4 atmosphere gauge in the L.P. spaces 29 and 33 in conformity with the maximum member of revolutions of the rotor 6 of the motor 2 and at a pressure in the H.P. spaces 30 and 34 e.g. ranging from 150 to 250 atmospheres, the low pressure is linearly reduced from 4 to 2.5 atmospheres. Therefore the number of revolutions is automatically reduced at the output of the hydraulic motor so that the transmitted power (product of torque multiplied by the number of revolutions) remains constant from 150 to 250 atmospheres and the power source 37 and 48 (see FIG. 2 and 3) is protected from overload.

It is obvious that the displacement volume of the plungers 19 in the pump 1 which are displaceable under pressure needs only one equal to, but may also be smaller than that of the pistons 3. E.g. when it is not required to adjust, in a stepless variable manner, the number of revolutions at the output of the hydromotor 2 from zero to a desired maximum, but when it is sufficient to adjust from a minimum number of revolutions, e.g. 100 RPM, to a maximum of e.g. 2,500 RPM.

When the machine according to the invention is applied as a drive for a vehicle, a particular torque will be transmitted at 150 atmospheres in the H.P. spaces 30 and 34 and at a maximum number of revolutions. Should the vehicle now mount a slope, which indicates that a maximum torque is required, the pressure on the H.P. side will be raised to 250 atmospheres. Now the automatic action of the pressure regulator 25, through the use of conventional means as described hereinabove relating to the pressure regulator becomes effective and the pressure in the L.P. spaces 29 and 33 will fall to 2.5 atmospheres as a consequence of which the number of revolutions of the hydraulic motor 2 and therefore of the differential of the vehicle is reduced. It is obvious that this is a consequence of the change in the displacement volume caused by the plungers 19 and 20.

The hydraulic pump 1 and the hydraulic motor 2 are each provided with two separate spaces 29 and 30, or 33 and 34, respectively, so that both the pump and the motor can be operated in the two directions of rotation. Obviously, the spaces 29 and 30 as well as 33 and 34, respectively may be provided entirely apart from the hydraulic pump 1 and hydraulic motor 2. The rotors 5 and 6 may be supported in ball bearings within a housing provided with cooling ribs, 38 and 39. The rotors are sealed on their front side as well as at two zones along their periphery in the area 40 and 41 or 42 and 43, respectively against the inner side of the housing, so that according to the direction of rotation, a H.P. and L.P. side 29 and 30, 34 and 33, respectively is obtained.

When the hydraulic pump 1 is driven either directly or via a planet gear 44 by a gas turbine 37 (FIG. 2) operating with a relatively high number of revolutions and when the hydraulic motor 2 should operate in the two directions of rotation, then the desired direction of rotation of the output shaft 45 can be selected by turning mechanically or manually the switch lever 26 of the pressure regulator 25 into the position the position F or R.

The rotor 5 of the pump 1 is secured to the driving shaft 46 and so is the rotor 6 of the motor 2 with the output shaft 45. In FIG. 2 it may be seen that the machine is driven by a gas turbine 37 having an intermediate planet gear 44. A blower 47 enhances the efficiency of the cooling ribs 38, 39 respectively. In FIG. 3 the machine is shown being driven directly by a Diesel engine 48. Also, accumulation chambers 23 or 24 may be used in only the pump 1 or in only the motor 2 whenever it becomes not necessary to have a complete range of speed variations available as when a reduction of from 1:1 to 1:6 is sufficient.

What I claim is:

1. Hydraulic speed gear with a stepless variable adjustment comprising a pump and a motor defining two positive displacement machines, each said machine having a housing provided with a rotary displacement member communicating with a low-pressure working space and a high-pressure working space therein, at least one of said rotary displacement members being provided with accumulation chambers each comprising a movable wall periodically communicating with said working spaces of the machine, means being provided for adjusting the pressure in the low-pressure working space of the machine, so that the volume of said accumulation chambers on traversing said low-pressure working space may be modified in such a manner that, due to the alteration of the said pressure, the displacement volume of the machine is varied.

2. Hydraulic speed gear according to claim 1, wherein each of said movable walls of each accumulation chamber with increasing low pressure during the traversing of the low pressure space move in such a way that an increase of the volume of the pump and a decrease of the volume of the motor, respectively, is produced.

3. Hydraulic speed gear according to claim 1 wherein said rotor is provided with radial pistons thereon, and each accumulation chamber is located in pistons of said at least one rotary displacement member.

4. Hydraulic speed gear according to claim 2 wherein said movable walls of each accumulation chamber are defined as plungers which are each movable against the force of springs.

5. Hydraulic speed gear according to claim 1 wherein each of said movable walls of each accumulation chamber is slidable in an axial direction of said at least one rotary displacement member.

* * * * *